(No Model.)
H. L. CALLENDAR.
APPARATUS FOR ELECTRICALLY MEASURING TEMPERATURE.
No. 598,905.   Patented Feb. 15, 1898.
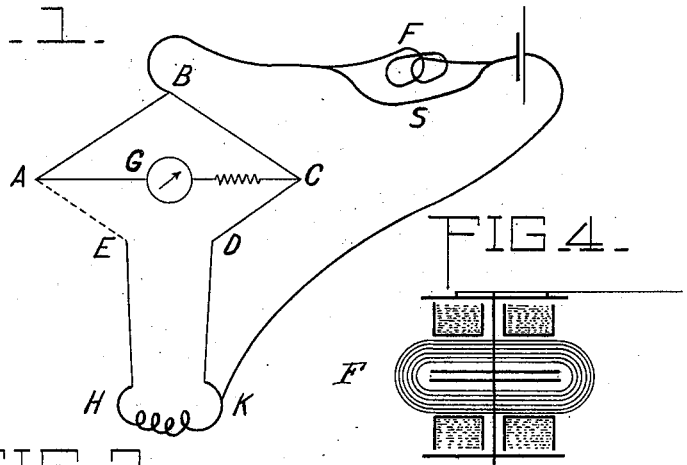
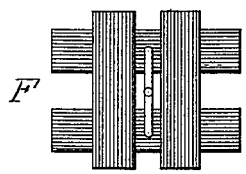
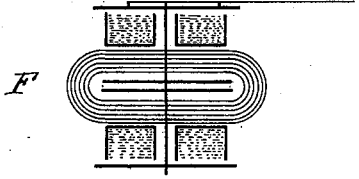
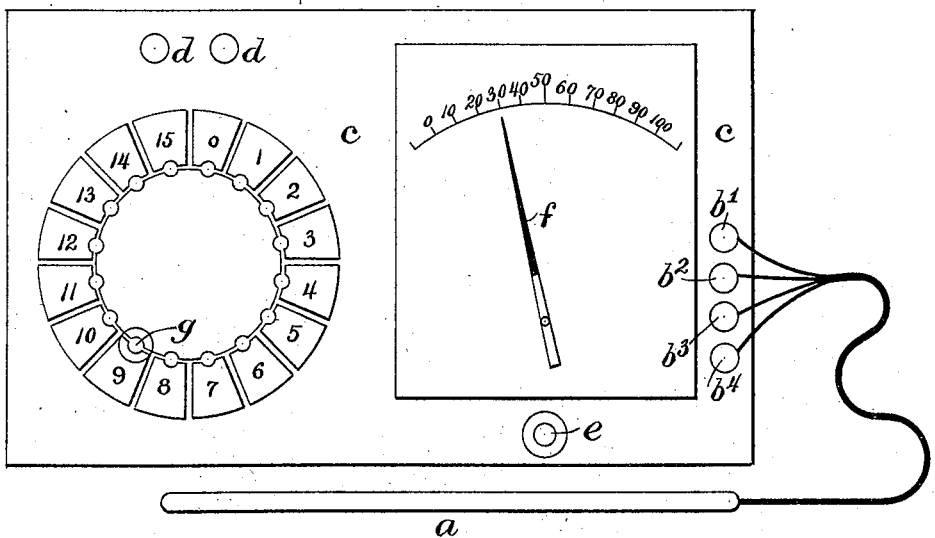
Witnesses.
W. E. Allen.
Jas. W. White
Inventor.
Hugh L. Callendar.
By Knight Bros.
Attys.

UNITED STATES PATENT OFFICE.

HUGH LONGBOURNE CALLENDAR, OF MONTREAL, CANADA.

APPARATUS FOR ELECTRICALLY MEASURING TEMPERATURES.

SPECIFICATION forming part of Letters Patent No. 598,905, dated February 15, 1898.

Application filed July 31, 1896. Serial No. 601,135. (No model.) Patented in England December 21, 1891, No. 22,326.

*To all whom it may concern:*

Be it known that I, HUGH LONGBOURNE CALLENDAR, a subject of the Queen of Great Britain, and professor of physics in the McGill University, city of Montreal, Dominion of Canada, have invented certain new and useful Improvements in Apparatus for Electrically Measuring Temperatures, (for which I have obtained British Letters Patent No. 22,326, dated December 21, 1891,) of which the following is a specification.

In the ordinary method of measuring resistance in apparatus of this character the deflections of the galvanometer vary both with the strength of the battery and with the temperature of the galvanometer-coils. I compensate my galvanometer in such a way that its deflections are the same for the same change of the resistance measured whatever the variations in the strength of the battery and in the temperature of the galvanometer.

I make my galvanometer with a second set of coils, called the "field-coils," in addition to the usual coils of the instrument. These field-coils are set with their axis at right angles to the other coils and are included in the battery-circuit. They are also provided with a shunt whose resistance is adjusted so that a suitable portion of the battery-current passes through the coils. I either make the needle of an astatic combination of magnets or I neutralize the earth's magnetic field on the needle by means of control-magnets. If the strength of the battery varies, the strength of the current both in the galvanometer and field coils varies in the same proportion, so that the deflection of the needle remains constant.

In order to compensate the galvanometer for changes of temperature which would make its resistance vary and therefore change its sensitiveness, I make the field-coil shunt of wire, such as German silver, having a smaller temperature coefficient than the field-coils. I also put in series with the galvanometer-coils a similar resistance, which is adjusted so that the increase of resistance of the galvanometer-coils due to rise of temperature is proportional to the decrease of current in the field-coils. If $g$ be the resistance of the galvanometer and $a$ that of the wire in series with the galvanometer-coils and if $r$ be the resistance of the field-coils and $s$ that of the shunt, the resistance $a$ and $s$ must be adjusted so that the percentage increase of the resistance $(g \times a)$ is equal to that of $\frac{(r \times s)}{(s)}$. A galvanometer so compensated is particularly adapted for observing small changes of resistance by the Wheatstone-bridge method and may be used with great advantage in connection with electrical pyrometers and voltmeters.

My invention will be understood upon reference to the accompanying drawings, in which—

Figure 1 is a diagram of the arrangement of the parts of the apparatus, and Fig. 2 is a plan of an apparatus embodying the principles of my invention. Fig. 3 is a plan view of the coils. Fig. 4 is a sectional view thereof.

Referring to Fig. 1, the arms A B, B C, C D of the bridge are equal in resistance, while the remaining arm embraces the pyrometer-wire H K and a resistance-box A E.

F represents the field-coils of the galvanometer, and S the shunt around said field-coils, which are included in the battery-circuit. The galvanometer-coils G are inserted between A and C. The coils F and G are in close proximity to each other and always nearly equal in temperature, and the galvanometer-coils G are preferably placed within the field-coils, as shown in Figs. 3 and 4.

D K, E H are the leads of the pyrometer. The battery-circuit is connected to B and to one end of the pyrometer-coil at K. Resistances are unplugged in the arm A E till the resistance A K is nearly equal to K C. The galvanometer may be graduated in degree of temperature for a range of, say, 100° and the resistance of the pyrometer adjusted so that the units-coil in the box is equal to the increase of resistance of the pyrometer-wire in 100° of temperature. When the temperature rises so that the galvanometer gets to the end of its range, a plug is put in, so that the resistance in the arm A K is reduced to its previous value, and the needle of the galvanometer starts again at the beginning of the scale. The resistance in all four arms of the bridge being the same as before, the galvanometer deflections represent the same change of resistance. The rise of the degrees of the galvanometer graduations is therefore the same in any part of the scale of temperature, and the range of temperature covered by the galvanometer may be made to correspond to any part of the scale by suitably adjusting the resistance in the box A E.

In order to apply such a galvanometer to indicate variations of electric pressure, I apply the pressure or a known fraction of it in place of the battery to the terminals of the Wheatstone-bridge arrangement above described; but instead of using a pyrometer of the ordinary form I employ a fine platinum or other suitable wire in the arm A K of the bridge, and I observe the changes of its resistance due to the heating effect of the current passing through it. In order to compensate the voltmeter for changes in the external temperature, I make the resistance in the arm A B or D C of the bridge of a similar wire to the voltmeter-wire of equal resistance and temperature coefficient, but of larger mass and surface, and inclose it in the same tube with the voltmeter-wire, so that the changes in the external conditions affect both equally. The difference in their resistances due to the current heating is indicated by the galvanometer, and which will therefore show any variations in the pressure. Large changes of pressure are measured, as before, by putting adjustable resistances in the circuit to balance them. The arrangement can also be used as an ammeter by shunting the terminals with a suitable known resistance through which the current to be measured is passed.

Fig. 2 of the drawings shows an electrical pyrometer suitable for use in the arts in measuring temperatures of gases or molten masses up to 1,500° centigrade.

$a$ is a pyrometer-tube, of hard glass or porcelain, containing near its extremity the coil of platinum wire which has to be brought to the temperature to be measured. This pyrometer-tube is fitted with leads to the platinum coil and also with leads compensating for changes in temperature. These four leads are coupled by the binding-screws $b'$ $b^2$ $b^3$ $b^4$ with the box $c$, in which are contained the resistance-coils and galvanometer of the measuring apparatus. $d$ $d$ are binding-screws for connecting the battery. $e$ is a key for closing the battery-circuit. $f$ is a long index upon the axis of the galvanometer-needle. It moves over an arc which is graduated from "0" to "100." The apparatus is so adjusted that each of these graduations corresponds to one degree centigrade. The galvanometer-bobbins are of the ordinary oval form. Indeed, the galvanometer itself presents no peculiarity except the addition to it of field-coils. The field-coils are wound upon two bobbins, which surround the galvanometer-bobbins and are symmetrically disposed in relation to the axis of the needle, which is an astatic combination. Upon the top of the box are brass contact-pieces marked "0" to "15." They surround a central disk, and there is a plug $g$, which can be inserted between the central disk and any one of the contact-pieces around it. There are resistance-coils within the box connecting the circle of contact-pieces the one with the other. The connections within the box are such that when the plug $g$ is at "0" all these resistances are connected in series with the platinum pyrometer-coil, and this series forms one side of the Wheatstone bridge. If the plug $g$ be inserted at "1," one of the set of coils is put out of circuit; if at "2," two, and so on. I so adjust the instrument that the resistance of one of these coils is equal to the increase in resistance of the platinum pyrometer-coil when its temperature is raised by 100° centigrade. The box also contains resistance-coils forming the three permanent sides of the Wheatstone bridge. The connections are such as indicated in the diagram Fig. 1.

In a pyrometer such as is represented in Fig. 2 the following proportions, or thereabout, will be found suitable, but they admit of much variation: galvanometer-coils—resistance ten ohms, number of turns two hundred; field-coils—resistance one hundred ohms, number of turns one thousand; German-silver shunt on field-coils—resistance about ten ohms; German silver in series with galvanometer—resistance about one ohm; permanent sides of bridge—resistance twenty ohms in each; platinum coil—resistance about four ohms, (cold;) plug resistances one ohm in each coil; battery—a large Leclanché or storage cell.

The resistance-coils forming the sides of the Wheatstone bridge should be made of an alloy which does not change appreciably in resistance at ordinary temperatures.

In the use of the instrument the plug $g$ is inserted into one or other of the holes in accordance with the temperature expected to be found—for example, if 900° centigrade be expected, then at 9. This being done, the finger-key $e$ is depressed, care being taken, however, previously to observe that a sufficient length of the pyrometer-tube is fully heated to the temperature which it is required to measure. If on closing the circuit the index passes off the scale, it is an indication that the plug $g$ should be shifted either one step higher if the index traverses the whole scale or one step lower if it falls away from it. When the index stops on the scale, it gives the indication required—say, for example, the plug $g$ is at "9" and the index stops at "30," the temperature is read 930° centigrade.

For purposes requiring the greatest attainable accuracy I use a mirror-galvanometer; but in other cases the index, as shown in the drawings, is preferable.

In like manner I can construct a voltmeter. The points between which the difference in potential is to be measured replaces the battery used with the pyrometer, and the pyrometer-tube shown in Fig. 2 is replaced by a platinum wire so proportioned that it carries a comparatively small current and becomes heated in so doing, but not so highly heated as to risk injury to the instrument. This wire I preferably inclose in a glass tube, and I exhaust the air therefrom. With this wire I inclose also four other similar wires. The first wire forms, together with the plug resistances, one side of the Wheatstone bridge. Another side is formed by the other wires contained in the glass tube. These are so coupled in parallel and series as to have when cold the same resistance as the single wire. The remaining sides of the bridge are other equal resistances. With the exception of the platinum wire all the resistances are such that they do not become appreciably heated in the use of the instrument. The proportions and the graduations should be such that the scale may be read in volts.

In like manner an ampere-meter may be constructed, the proportions given to the parts being suitably adjusted to the current which may be passed through the instrument.

Having thus described my invention, what I claim as new therein, and desire to secure by Letters Patent, is—

1. In a pyrometer substantially as described, the combination of a galvanometer and an electric circuit of a standard resistance, including said galvanometer, the compensating field-coils also in said circuit, and the pyrometer-wire adapted for use in the manner explained and in connection with said electric circuit, for the purpose set forth.

2. In combination with a pyrometer employing a galvanometer placed in a battery-circuit substantially as described; the herein-described compensating field-coils for the purpose set forth.

3. The combination with a Wheatstone-bridge apparatus and a galvanometer, of the herein-described field-coils arranged in compensating relation to the galvanometer as explained, for the purpose of counteracting the effect of variations in the electromotive force of the battery.

HUGH LONGBOURNE CALLENDAR.

Witnesses:
　HENRY FRY,
　RONZO H. CLERK.